United States Patent [19]
Easterday

[11] Patent Number: 6,163,005
[45] Date of Patent: Dec. 19, 2000

[54] STUD WELDING GUN

[75] Inventor: William C. Easterday, Elyria, Ohio

[73] Assignee: Nelson Stud Welding, Inc., Elyria, Ohio

[21] Appl. No.: 09/371,880

[22] Filed: Aug. 9, 1999

[51] Int. Cl.[7] .................................................. B23K 9/20
[52] U.S. Cl. ............................................ 219/99; 219/98
[58] Field of Search ......................... 219/98, 99; 221/266

[56] References Cited

U.S. PATENT DOCUMENTS

| | | | |
|---|---|---|---|
| 3,303,318 | 2/1967 | Spisak | 219/98 |
| 3,371,184 | 2/1968 | Napoli | 219/98 |
| 3,532,851 | 10/1970 | Glorioso . | |
| 3,679,860 | 7/1972 | Spisak . | |
| 4,019,013 | 4/1977 | Spisak . | |
| 5,067,632 | 11/1991 | Aubry | 221/266 |
| 5,824,987 | 10/1998 | Volk | 219/98 |
| 6,025,569 | 2/2000 | McCardle et al. | 219/99 |

OTHER PUBLICATIONS

TRW Instruction Maintenance Manual, NS–40, Standard Duty Welding Guns, publication date unknown, but prior to Jul. 1, 1999.

Primary Examiner—Clifford C. Shaw
Attorney, Agent, or Firm—Howard & Howard

[57] ABSTRACT

A stud welding gun (20) includes a frame (36) which extends outward from a handle assembly (24). A chuck (46) on an outer end portion of the frame holds a stud (22) while the stud is being welded to a base member. A stud supply (60) is connected with the frame (36) and includes a housing (64) which receives a stud retainer or magazine (70) containing a linear array (72) of studs (22) disposed in a side-by-side relationship. The studs (22) are fed from the retainer (70) in the stud supply housing (64) to a receiving location (62). A stud feed member (76) is manually moved from a retracted position to an extended position to sequentially feed studs (22) to the chuck (46). The size of a linear slot (88) in the stud supply housing (64) can be varied to enable retainers (70) containing studs (22) of different lengths to be positioned in the stud supply housing.

11 Claims, 7 Drawing Sheets

STUD WELDING GUN

BACKGROUND OF THE INVENTION

The present invention relates to a new and improved stud welding gun which is used to weld studs to a base member.

Stud welding guns have previously been utilized to weld studs to a base member. The studs are welded to the base member by establishing an electrical arc between the stud and base member.

Known automatic stud feeding systems have been utilized to supply studs to stud welding guns. At least one known stud feeding system has used compressed air to blow a stud to the welding gun from a remotely located stud feeder. This feeding system requires a compressed air supply which, at some locations, may not be readily available. In addition, the conduit through which the studs are blown to the welding gun increases the overall weight of the welding gun and impedes movement of the welding gun from one location to another. Known stud welding guns are disclosed in U.S. Pat. Nos. 3,532,851; 3,679,860; and 4,019,013.

SUMMARY OF THE INVENTION

An improved stud welding gun is used to weld studs to a base member. The stud welding gun includes a frame which extends outward from the handle assembly. A chuck is disposed at an outer end portion of the frame and holds a stud during welding of the stud to the base member.

A stud supply may be connected with the frame. The stud supply assembly is operable to sequentially feed studs along a linear supply path to a receiving location disposed between the handle assembly and the chuck. A stud feed member is connected with the frame and is movable from a retracted position to an extended position to move a stud from the receiving location toward the chuck. A manually engageable actuator member may be connected with the stud feed member to move the stud feed member between the extended and retracted positions under the influence of force manually applied to the actuator member.

A latch may be provided to retain the stud feed member in the extended position during welding of a stud to a base member. The latch is movable relative to the stud feed member between an engaged condition and a disengaged condition.

The stud supply may include a housing which is connected with the frame. A stud retainer may be provided to hold a plurality of studs. The stud retainer is disposed in an opening in the housing with a longitudinal central axis of each of the studs extending along the path of movement of the stud feed member between the extended and retracted positions. A stud mover sequentially moves studs into the path of movement of the stud feed member.

Retainer members of different sizes may be provided to hold studs of different lengths. An opening in which the retainer members are inserted into the stud welding gun can be changed in size to accommodate the different sizes of retainer members which hold the studs of different lengths.

BRIEF DESCRIPTION OF THE DRAWINGS

The foregoing and other features of the invention will become more apparent upon a consideration of the following description taken in connection with the accompanying drawings wherein.

DESCRIPTION OF ONE SPECIFIC PREFERRED EMBODIMENT OF THE INVENTION

General Description

A stud welding gun 20 (FIG. 1) is utilized to sequentially weld studs 22 to a base member (not shown). The stud welding gun 20 includes a handle assembly 24 having a pistol grip 26 with a trigger switch 28. The trigger switch 28 is connected with a known controller by an electrical cable 30. Electrical current for establishing an arc between a stud 22 and a base member (not shown) is conducted to the pistol grip 26 through a second electrical cable 32. The general construction of the handle assembly 24 is the same as is disclosed in U.S. Pat. No. 3,809,849.

Figures 1, 2:
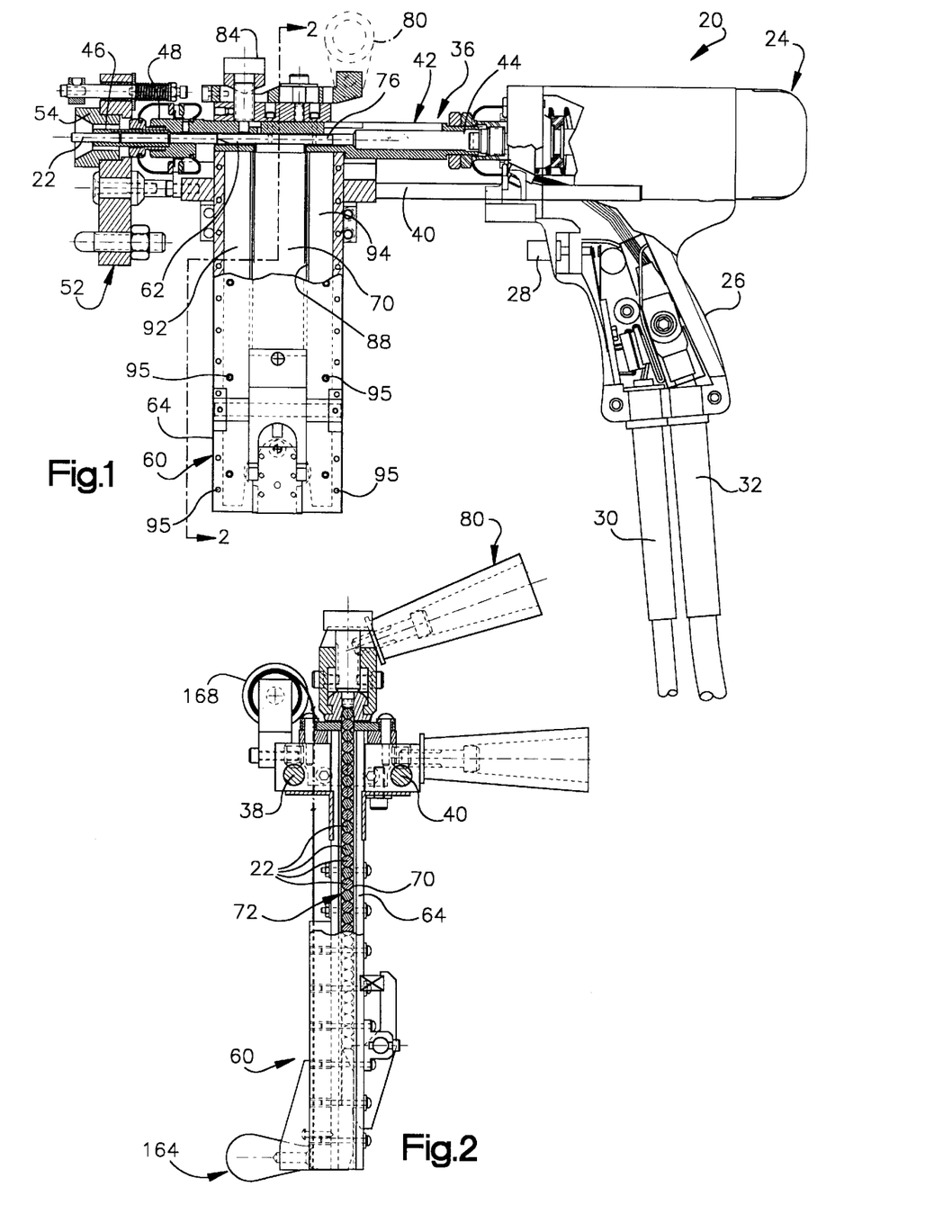
FIG. 1 is a partially broken away side elevational view of a stud welding gun constructed in accordance with the present invention.
FIG. 2 is a sectional view, taken generally along the line 2—2 of FIG. 1, further illustrating the construction of the stud welding gun.

Stud welding gun attachments may be referred to as a frame 36 which extends outward from the handle assembly 24. The frame 36 includes a pair of parallel solid cylindrical support rods 38 and 40 (FIG. 2). The support rods 38 and 40 are fixedly connected with the handle assembly 24. In addition, the frame 36 includes a tubular cylindrical barrel 42 (FIG. 1) which is movable along a longitudinal axis which extends parallel to the longitudinal axes of the support rods 38 and 40. A right (as viewed in FIG. 1) end portion 44 of the barrel 42 is connected with the handle assembly 24. A lifting mechanism, such as is disclosed in U.S. Pat. No. 3,809,849, is operable to move the barrel 42 along its longitudinal axis relative to the handle assembly 24.

A chuck 46 is connected with a left end portion 48 of the barrel 42. The chuck 46 holds each of the studs in turn during welding of the stud to a base member (not shown). A known foot assembly 52 is connected with the support rods 38 and 40. The foot assembly 52 includes a spark shield 54 which extends around a stud 22 which is held by the chuck 46 during welding of the stud to the base member.

In accordance with one of the features of the present invention, a stud supply 60 is operable to sequentially feed studs along a linear supply path to a receiving location 62 in the barrel 42. The stud supply 60 includes an elongated rectangular housing 64 which is fixedly connected with the support rods 48 and 40 and extends downward (as viewed in FIG. 1) from the support rods.

Figure 3:
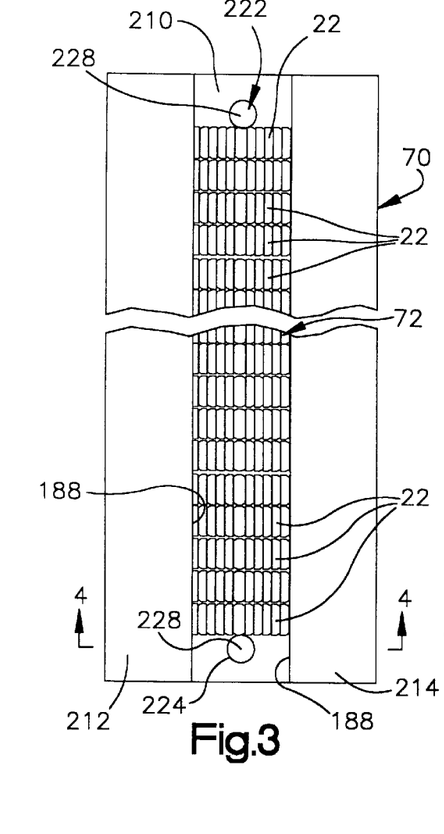
FIG. 3 is an enlarged plan view of a stud retainer or magazine which is received in a supply housing of the stud welding gun of FIG. 1.

In accordance with another feature of the present invention, the housing 64 holds a stud retainer or magazine 70 (FIGS. 1–4) in which a plurality of studs 22 are disposed in a linear array 72 (FIGS. 2 and 3). The studs 22 are disposed in the linear array 72 with the studs in a side-by-side relationship. Longitudinal central axes of the studs 22 extend parallel to each other and parallel to a longitudinal central axis of the tubular barrel 42 (FIG. 1) of the stud welding gun 20. By supplying studs 22 to the stud welding gun 20 in the stud retainer 70, loading the stud welding gun with studs is facilitated.

In accordance with another feature of the present invention, a stud feed member 76 (FIG. 1) is movable along the barrel 42 from a retracted position to the extended position illustrated in FIG. 1 to move a stud from the receiving location 62 toward the chuck 46. When the cylindrical stud feed member 76 is moved axially toward the right (as viewed in FIG. 1) from the extended position to the retracted position, the stud feed member moves out of the receiving location 62 to enable the stud supply 60 to feed a next succeeding stud 22 into the receiving location. The stud feed member 76 is then moved toward the left, to the position illustrated in FIG. 1, to push a stud from the receiving location 62 toward the chuck 46. As this occurs, a stud 22 is pushed into the chuck 46 to the welding position illustrated in FIG. 1.

In accordance with another feature of the invention, a manually engageable actuator member or handle 80 is connected with the stud feed member 76. The actuator member 80 is manually gripped by an operator of the stud welding gun 20 and pulled toward the right (as viewed in FIG. 1) to move the stud feed member 76 from the extended position to the retracted position. Similarly, the actuator member 80 is manually gripped by the operator and pushed toward the left (as viewed in FIG. 1) to move the stud feed member 76 from the retracted position back to the extended position illustrated in FIG. 1. As the stud feed member 76 moves from the retracted position to the extended position, a stud 22 is pushed from the receiving location 62 toward the chuck 46.

In accordance with another feature of the present invention, a latch 84 is provided to hold the stud feed member 76 in the extended position of FIG. 1 during welding of a stud held by the chuck 46 to a base member. The latch 84 (FIGS. 1, 7 and 14) is operable to a disengaged condition prior to movement of the stud feed member 76 from the extended position to the retracted position. During movement of the stud feed member 76 from the retracted position to the extended position, the latch 84 functions as a stop to block leftward (as viewed in FIG. 1) movement of the stud feed member 76 when it reaches the extended position.

In accordance with another feature of the invention, the size of an opening or slot 88 (FIG. 1) in the stud supply housing 64 can be varied to accommodate studs of different lengths. As was previously mentioned, the studs 22 are held in a linear array 72 in a stud retainer 70. The studs 22 illustrated in FIGS. 3 and 4 have a relatively short length. However, studs 22a (FIGS. 5 and 6) have a relatively long length. The long studs 22a are held in a stud retainer 70a having a greater width, as measured in a direction perpendicular to a longitudinal central axis of a stud retainer 70a, than does the stud retainer 70 of FIGS. 2 and 3. However, the stud retainer 70a has the same length as the stud retainer 70 of FIGS. 2 and 3.

Figure 4:
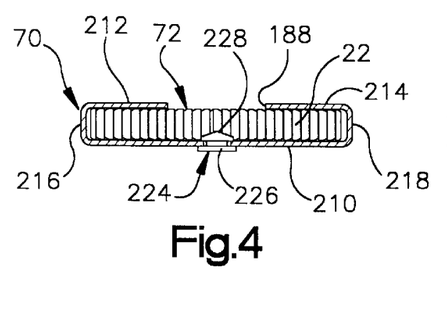
FIG. 4 is a sectional view, taken generally along the line 4—4 of FIG. 3, further illustrating the relationship between a stud and the retainer.
Figure 5:
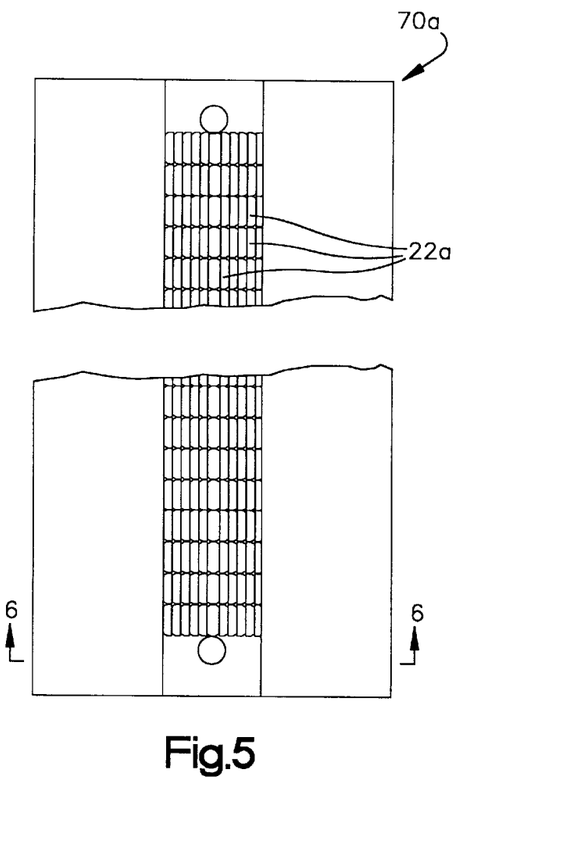
FIG. 5 is a plan view, generally similar to FIG. 3, of a stud retainer which is received in the supply housing of the stud welding gun of FIG. 1 and holds longer studs than the stud retainer of FIG. 3.
Figure 6:
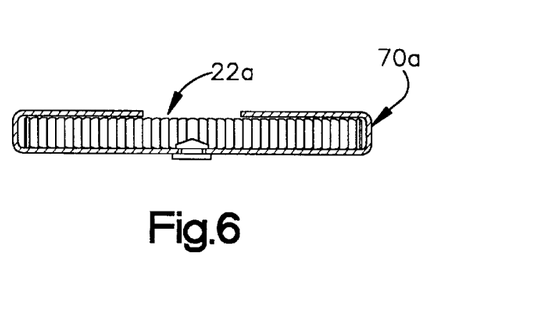
FIG. 6 is a sectional view, taken generally along the line 6—6 of FIG. 5, further illustrating the relationship between a stud and the retainer.

In order to enable the stud supply 60 to feed either the relatively short studs of FIGS. 3 and 4 or the relatively long studs of FIGS. 5 and 6, the housing 64 is adjustable to change the size of the opening 88 (FIG. 1). When the size of the opening 88 is to be adjusted, rectangular spacer strips 92 and 94 are removed from the housing. To remove the spacer strips 92 and 94, fasteners 95 (FIG. 1) are removed.

If the size of the opening or slot 88 is to be increased to accommodate the stud retainer 70a and the relatively long studs 22a (FIGS. 5 and 6), the spacer strips 92 and 94 are removed from the housing and narrower spacer strips substituted for the spacer strips 92 and 94. The narrow spacer strips are held in place by the fasteners 95. For even longer studs 22, the spacer strips 92 and 94 are omitted. The relatively narrow spacer strips or the omission of spacer strips result in the opening or slot 88 being wider so as to accommodate the wider stud retainer 70a of FIGS. 5 and 6.

It should be understood that although only a pair of stud retainers 70 and 70a have been illustrated in FIGS. 3 and 5, additional stud retainers may be provided to hold studs of lengths which are different than the lengths of the studs 22 and 22a of FIGS. 3 and 5. Spacer strips, corresponding to the spacer strips 92 and 94 of FIG. 1, of different sizes or no spacer strips, as appropriate, are provided in association with each of the different size stud retainers 70 to enable the opening or slot 88 in the stud supply housing 64 to be adjusted to accommodate the particular width of a stud retainer associated with a particular length of stud 22.

The studs 22 have a generally cylindrical configuration which enables them to engage each other throughout their length and to be disposed in a side-by-side relationship in a linear array 72. If the studs 22 were provided with a relatively large head end portion and a shank portion which extends from the head end portion, the studs could not be arranged in engagement with each other throughout their length and disposed in a side-by-side relationship in a linear array.

The studs 22 are advantageously provided with opposite end portions which are mirror images of each other so that the studs can be fed to the chuck 46 with either end of the stud leading. The specific studs 22 illustrated in FIGS. 3 and 5 have opposite end portions with annular retaining rings. The retaining rings on one end portion of a stud 22 are reversely arranged in comparison with the retaining rings on the opposite end of the stud. This results in the studs having opposite end portions which are mirror images of each other. Although the studs 22 could have many different constructions, it is contemplated that it may be preferred to construct the studs in the same manner as is disclosed in U.S. patent application Ser. No. 09/271,661 filed Mar. 17, 1999 by Clark B. Champney and William C. Easterday and entitled "Stud Having Annular Rings".

Movement of Stud Along Barrel to Chuck

Figure 7:
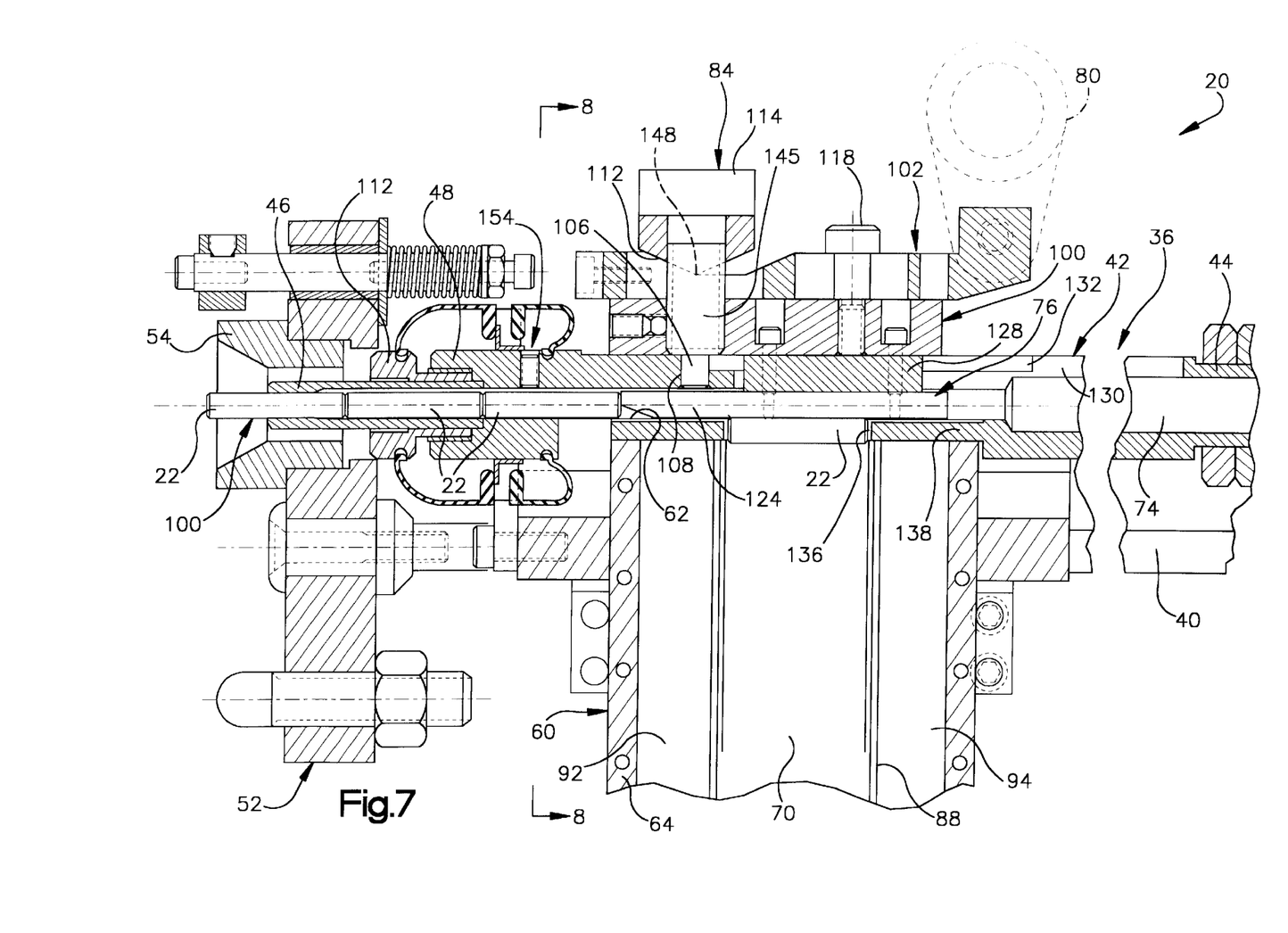
FIG. 7 is an enlarged fragmentary view of a portion of FIG. 1 and illustrating the relationship between a stud supply, a stud feed member, and a chuck which holds a stud during welding of the stud to a base member.

The stud feeder member 76 reciprocates along a cylindrical passage 74 (FIGS. 7, 9, 16, 17 and 18) in the barrel 42 to sequentially feed studs 22 from the receiving location 62 to the chuck 46 (FIG. 7). A carriage 100 is fixedly connected with the stud feed member 76. The actuator member 80 is fixedly connected to a slide member 102. The slide member 102 is mounted on the carriage 100 and is movable through limited distances toward either the left or right (as viewed in FIG. 7) relative to the carriage 100. The latch 84 is connected with the carriage 100 and moves with the carriage and stud feed member 76 relative to barrel 42.

The latch 84 has a cylindrical end portion 106 (FIGS. 7 and 14) which engages a cylindrical opening 108 74 (FIGS. 7, 15, 16, and 17) in the barrel 42. When the latch 84 is in the engaged condition shown in FIG. 7, the latch engages the opening 108 to hold the carriage 100 against movement relative to the barrel 42. By blocking movement of the carriage 100 relative to the barrel 42, the latch 84 prevents movement of the stud feed member 76 during welding of a stud 22 held by the chuck 46 to a base member.

During welding of a stud 22 held by the chuck 46, force is transmitted axially through a linear array of studs 22 disposed in the barrel 42. The linear array 110 of studs 22 extends from the chuck 46 through a chuck nut 112 to the stud feed member 76. At this time, the stud feed member 76 extends through the receiving location 62 to block the feeding of a stud from the stud supply housing 64 into the barrel 42.

Upon completion of welding of the leading stud 22 to the base member, the stud welding gun 20 is moved toward the right (as viewed in FIG. 7) to pull the stud welding gun off of the stud which is welded to the base member. Once the stud welding gun 20 has been disengaged from the stud which has been welded to the base member 22, the chuck 46 is empty and the array 110 of studs 22 in the barrel 42 can be advanced to position a next succeeding stud in the chuck.

In order to enable a stud 22 to be moved into the stud receiving location 62, the stud feed member 76 must be moved out of the receiving location. To accomplish this, an operator grips the actuator member 80 and pulls the actuator member toward the right (as viewed in FIG. 7). As the actuator member 80 is moved toward the right, the slide member 102 is also moved toward the right relative to the carriage 100. Rightward movement of the slide member 102 relative to the carriage 100 causes a cam surface 112 on the slide member to force a head end portion 114 (FIGS. 7 and 14) of the latch 84 upward (as viewed in FIG. 7) away from the stud feed member 76. A shoulder screw 118 is fixedly connected with the carriage 100 and guides movement of the slide member 102 relative to the carriage. As the latch 84 is moved upward by the cam surface 112, a spring 122 (FIG. 14) is compressed and the end portion 106 of the latch 84 moves out of the opening 108 (FIG. 7) in the barrel 42.

When the end portion 106 of the latch 84 has moved out of the opening 108 in the barrel 42, the stud feed member 76 and carriage 100 are released for movement relative to the barrel. Therefore, the continued application of manual force to the actuator 80 is effective to pull the stud feed member 76, carriage 100 and slide member 102 together toward the right (as viewed in FIG. 7). As this occurs, an end portion 124 on the stud feed member 76 moves away from the studs 22 disposed immediately ahead of the chuck 46.

Continued manual application of the rightward pulling force to the actuator member 80 by the operator of the stud welding gun 20 moves a spacer member 128 (FIG. 7) connected with the bottom of the carriage 100 along a linear rectangular slot 130 formed in the barrel 42. The stud feed member 76 is suspended from the carriage 100 with the spacer member 128 between the stud feed member 76 and the carriage. When the stud feed member 76 has moved to the retracted position, the end portion 106 of latch 84 abuts a stop surface 132 (FIGS. 7 and 15) formed in the guide slot 130 in the barrel 42 to block further rightward (as viewed in FIG. 7) movement of the carriage 100 and stud feed member 76.

When the stud feed member 76 has moved to the retracted position, a stud 22 disposed at the upper end of the linear array 72 in an opening 136 in a rectangular aperture or feed plate 138 is released for upward movement into the receiving location 62 in the barrel 42. When the stud 22 is in the receiving location 62 in the barrel 42, a longitudinal central axis of the stud 22 is aligned with a longitudinal central axis of the stud feed member 76.

After the stud feed member 76 has been moved to the retracted position, the operator reverses the force applied against the actuator member 80. Thus, rather pulling on the actuator member 80, the operator manually pushes against the actuator member 80. This pushing movement urges the actuator member toward the left (as viewed in FIG. 7).

Initial leftward movement of the actuator member 80 results in leftward movement of the slide member 102 relative to the carriage 100. The end portion 106 on the latch 84 slides along a shoulder 142 of the slot 130 (FIGS. 15, 16 and 18) to maintain the latch 84 in the disengaged condition. The shoulder 142 on the slot 130 holds the latch 84 in a disengaged position during leftward (as viewed in FIG. 7) movement of the slide member 102, carriage 100 and stud feed member 76.

As the stud feed member 76 moves leftward (as viewed in FIG. 7) from the retracted position, the end portion 124 of the stud feed member 76 moves into engagement with an end of a stud 22 disposed at the receiving location 62. Continued movement of the actuator member 80 and stud feed member 76 pushes the stud 22 from the receiving location into engagement with a preceding stud disposed in the barrel 42 ahead of the chuck 46. Continued leftward movement of the stud feed member 76 moves the next stud to be welded into the chuck 46 and moves the stud engaged by the end portion 124 of the stud feed member 76 out of the receiving location and into a line of studs waiting to move into the chuck 46.

As this occurs, the end portion 106 of the latch 84 moves into abutting engagement with a portion 144 (FIGS. 16 and 17) of the opening 108 in the barrel 42. This results in leftward (as viewed in FIG. 7) movement of the stud feed member 76 being interrupted with the stud feed member in the extended position illustrated in FIG. 7.

Figure 14:
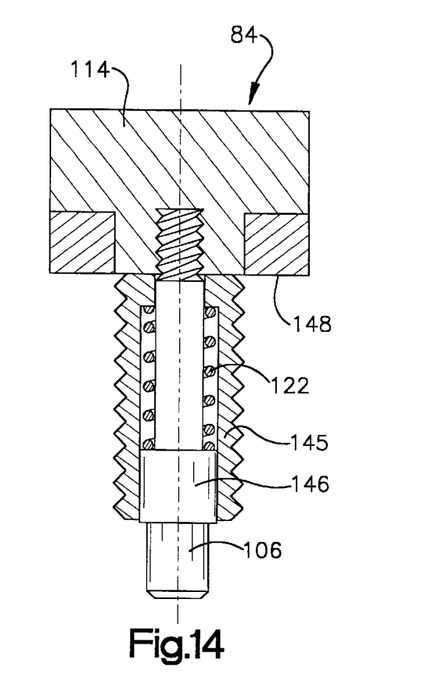
FIG. 14 is a simplified illustration of a latch which holds the stud feed member against movement during welding of a stud.
Figure 15:
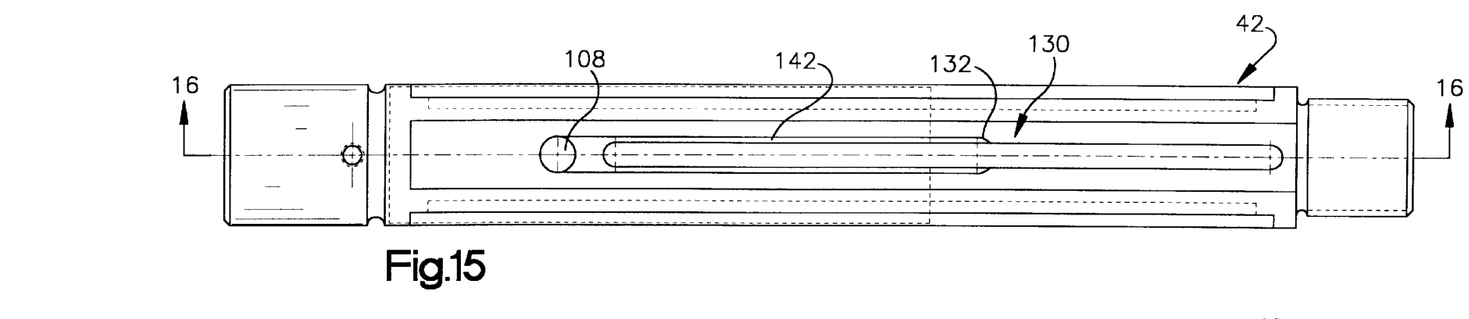
FIG. 15 is a top plan view of a barrel of the stud welding gun of FIG. 1.
Figures 16, 17, 18:
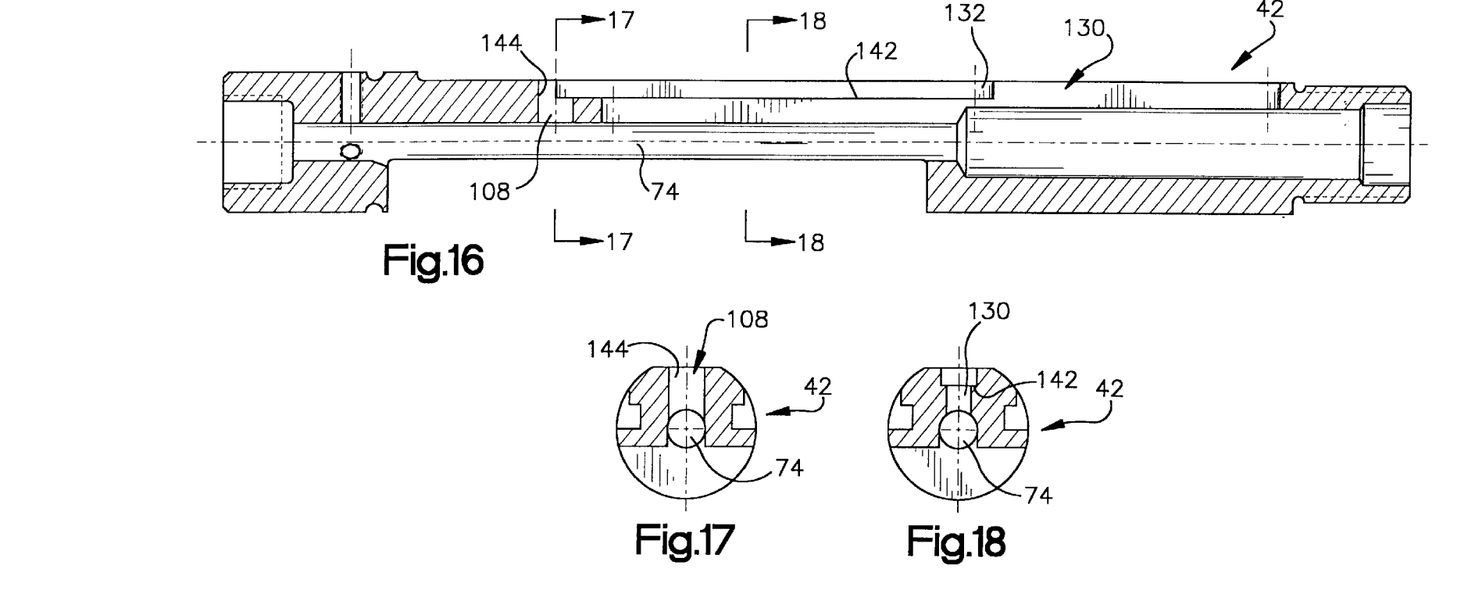
FIG. 16 is a sectional view, taken generally along the line 16—16 of FIG. 15, further illustrating the construction of the barrel.
FIG. 17 is a sectional view, taken generally along the line 17—17 of FIG. 16.
FIG. 18 is a sectional view, taken generally along the line 18—18 of FIG. 16.

The operator then interrupts the application of manual force to the actuator member 80. At this time, the end portion 106 of the latch is no longer held in the disengaged condition by the shoulder 142 on the slot 130. Force transmitted from the compressed spring 122 (FIG. 14) is transmitted from the latch body 145 to a cylindrical section 146 which is fixedly connected with the end portion 106. This force moves the end portion 106 downward into the opening 108 (FIG. 7) in the barrel 42 under the influence of the biasing spring 122 (FIG. 14).

When the stud feed member 76 has moved back to the extended position illustrated in FIG. 7, the leading stud 22 in the axially aligned array of studs in the barrel 42 is gripped by the chuck 46 and is in position for welding to a base member. The stud 22 gripped by the chuck 46 is blocked against rightward movement (as viewed in FIG. 7) by the studs disposed in the barrel 42 between the feed member 76 and the chuck.

It is contemplated that the stud welding gun 20 may be utilized to weld studs 22 to base members which are disposed above an operator, for example, to a ceiling or to an overhead beam. When stud welding gun 20 is used to effect an overhead stud welding operation, the barrel 42 of the stud welding gun may be pointed upward when the operator pulls the actuator member 80 to move the stud feed member 76 from the extended position illustrated in FIG. 7 toward the retracted position. At this time, a detent assembly 154 (FIGS. 7 and 8) in the barrel 42 prevents downward movement of a stud 22 immediately ahead of the receiving location 62 under the influence of gravity.

Figure 8:
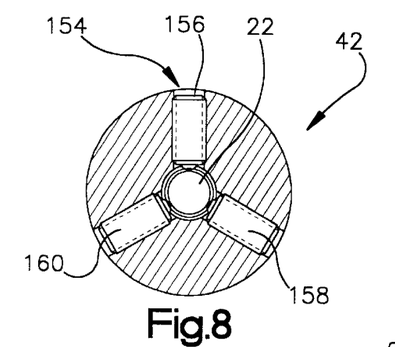
FIG. 8 is a sectional view, taken generally along the line 8—8 of FIG. 7, illustrating the relationship of a plurality of detent members to a stud which is disposed between the stud feed member and the chuck.

The detent assembly 154 includes a plurality of spring biased plungers 156, 158, and 160 (FIG. 8). The spring biased plungers 156, 156 and 160 grip the stud 22 disposed immediately ahead of the receiving location 62 to hold the stud against downward movement under the influence of gravity. Although the detent assembly 154 grips the stud 22 disposed immediately ahead of the receiving location 62 in the barrel 42, the detent assembly does not provide sufficient force to prevent studs from being fed through the detent assembly during movement of the stud feed member 76 from the retracted position to the extended position.

Stud Supply

The stud supply 60 (FIG. 1) is effective to move a stud 22 to the receiving location 62 when the stud feed member 76 moves to the retracted position. The stud supply 60 holds the linear array 72 of studs 22 with a longitudinal central axis of the linear array extending perpendicular to the path of movement of the stud feed member 76 relative to the barrel 42. Each time the stud feed member 76 is moved from the extended position to the retracted position, a single stud 22 is moved upward from an opening in the feed plate 138 (FIGS. 7 and 9) to the receiving location 62 in the barrel 42. As this occurs, a spring biased pusher member 164 (FIG. 10) urges the linear array 72 of studs 22 upward (as viewed in FIG. 10) to move a next succeeding stud 22 to the opening in the feed plate 138 (FIG. 9).

Figure 9:
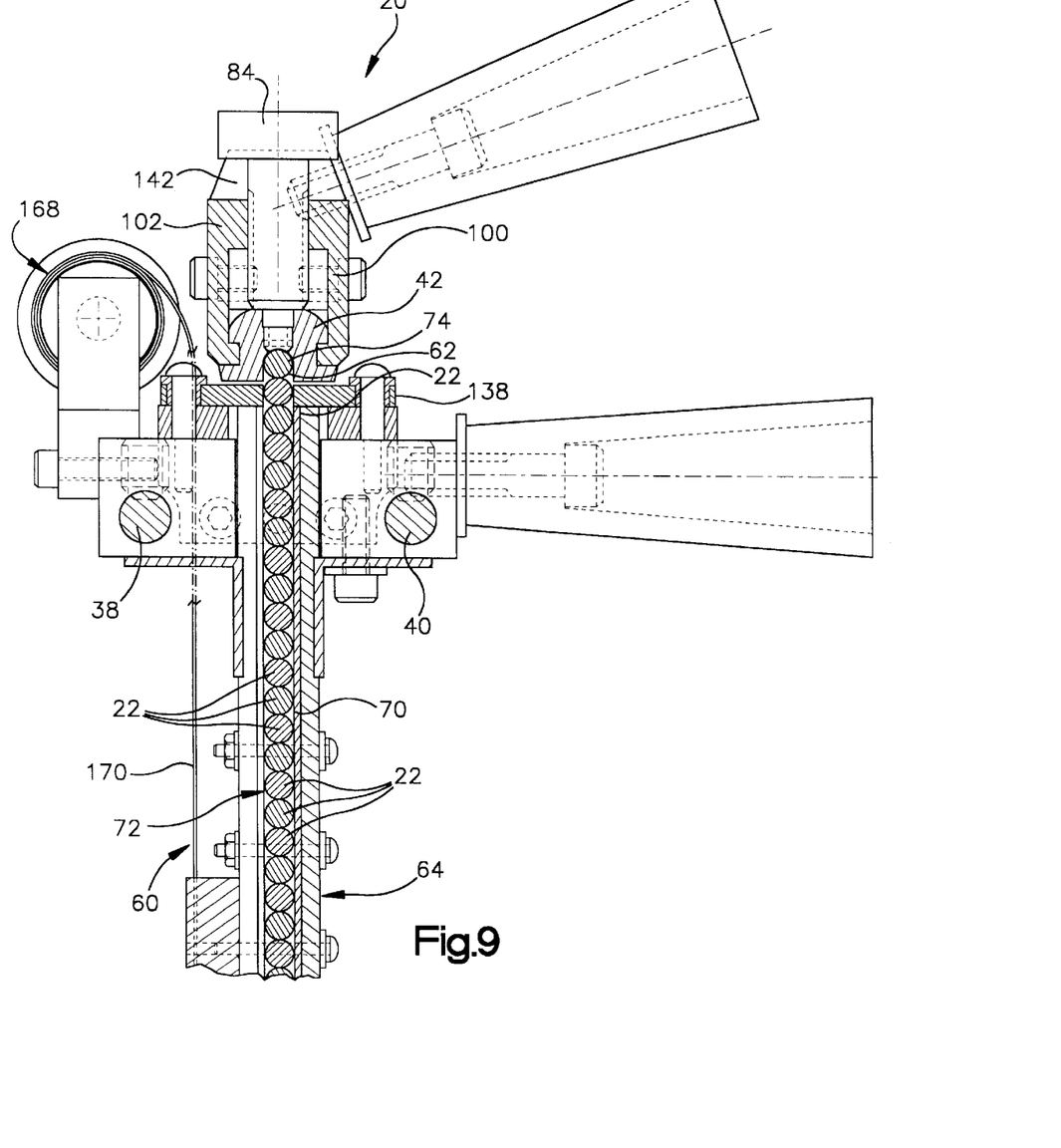
FIG. 9 is an enlarged fragmentary view of a portion of FIG. 2 and illustrating the relationship between the stud supply and a carriage which is connected with the stud feed member.
Figures 10, 11, 12:
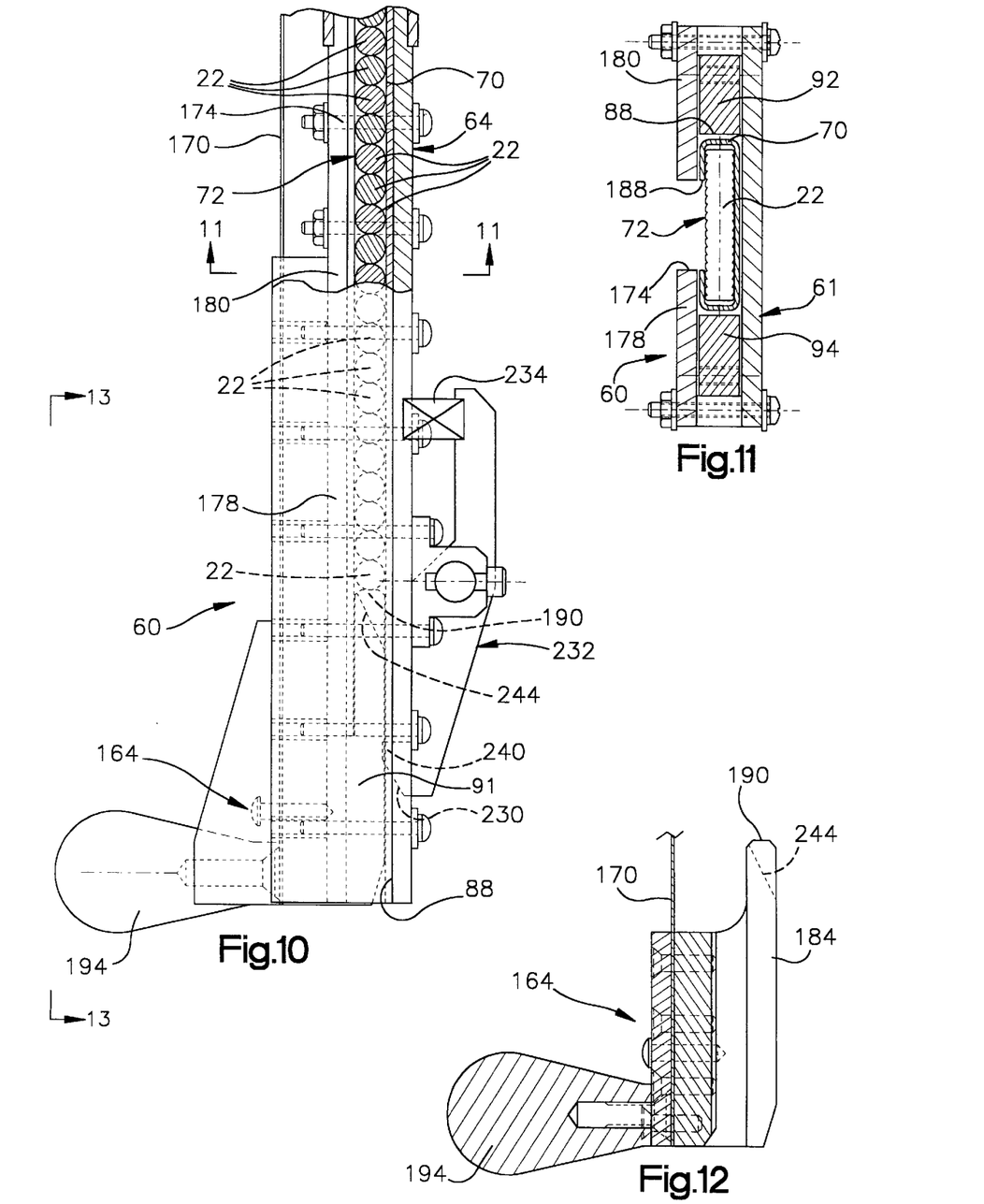
FIG. 10 is an enlarged fragmentary illustration of a portion of FIG. 2, illustrating the relationship between a pusher member and a plurality of studs held by a stud retainer in a housing of the stud welding gun of FIG. 1.
FIG. 11 is a sectional view, taken generally along the line 11—11 of FIG. 10, illustrating the relationship of a stud held by the stud retainer to the supply housing of the stud welding gun of FIG. 1.
FIG. 12 is a side elevational view of a pusher member which moves a linear array of studs relative to a stud retainer in the supply housing of the stud welding gun of FIG. 1.

The pusher member 164 is continuously urged upward (as viewed in FIGS. 2 and 10) toward the barrel 42 of the stud welding gun 20 by a spring 168 (FIG. 9). The spring 168 includes a band 170 which is connected to the pusher member 164 (FIGS. 9, 10 and 12). The spring 168 is a spiral coil spring which is coiled about an axis which extends parallel to the central axis of the barrel 42 and is disposed adjacent to the receiving location 62. The spring 168 continuously tensions the band 170 with a substantially constant force to pull the pusher member 164 upward (a viewed in FIG. 10).

The upward force applied to the pusher member 164 by the spring 168 (FIG. 9) is transmitted from the pusher member to a lowermost stud 22 (FIG. 10) in the linear array 72 of studs. Since the studs 22 in the linear array 72 of studs are disposed in engagement with each other, the force is transmitted through the linear array 72 of studs 22 to a stud disposed in an opening in the feed plate 138 (FIG. 9). This force urges the studs 22 toward the receiving location 62. Therefore, whenever the stud feed member 76 is moved from the extended position of FIG. 7 to the retracted position, the stud 22 disposed in the opening in the feed plate 138 moves to the receiving location 62 and a next succeeding stud moves into the opening in the feed plate 138.

As the studs 22 are sequentially welded onto a base member by operation of the stud welding gun 20, the pusher member 164 is moved upwardly along a slot 174 (FIG. 11) in the housing 64. The slot 174 is formed by a pair of parallel rectangular side walls 178 and 180 of the housing 64. The pusher member 164 has a foot portion 184 (FIG. 12) which is wider than the slot 174 and is movable into a stud retainer 70 to engage the linear array 72 of studs.

The stud retainer 70 (FIG. 3) has a linear slot 188 of substantially the same size as the slot 174 (FIG. 11) in the housing 64. The slot 188 in the stud retainer 70 is aligned with the slot 174 in the housing. Therefore, the foot portion 84 of the pusher member 164 can move upward along both the slot in the housing 174 and the slot 188 in the stud retainer 70 to push the entire array 72 of studs upward (as viewed in FIG. 10) toward the barrel 42 (FIG. 9) of the stud welding gun 20.

When the entire array 72 of studs 22 in the stud retainer 70 (FIG. 3) have been welded, the stud retainer will be empty. In addition, the last stud in the array 72 of studs will have been fed from the receiving location by the stud feed member 76. When the stud feed member 76 (FIG. 7) is moved back to the retracted position, a leading end portion 190 (FIG. 12) of the pusher member 164 enters the receiving location 62. Therefore, at this time, the pusher member 164 will block leftward (as viewed in FIG. 7) movement of the stud feed member 76 from the retracted position to the extended position. This provides a clear tactile indication to the operator of the stud welding gun 20 that there are no studs 22 in the stud supply 60.

After all of the studs 22 in a linear array 72 of studs have been fed from the stud supply 60 to the receiving location 62, the pusher member 164 is manually pulled downward (as viewed in FIGS. 9 and 10) away from the barrel 42 toward the lower end portion of the housing 64. The pusher member 164 is then moved to a holding position offset to one side of the opening 88 in the housing 64 to enable the empty stud retainer 70 to be removed from the housing 64 and a full stud retainer to be inserted into the housing.

Figure 13:
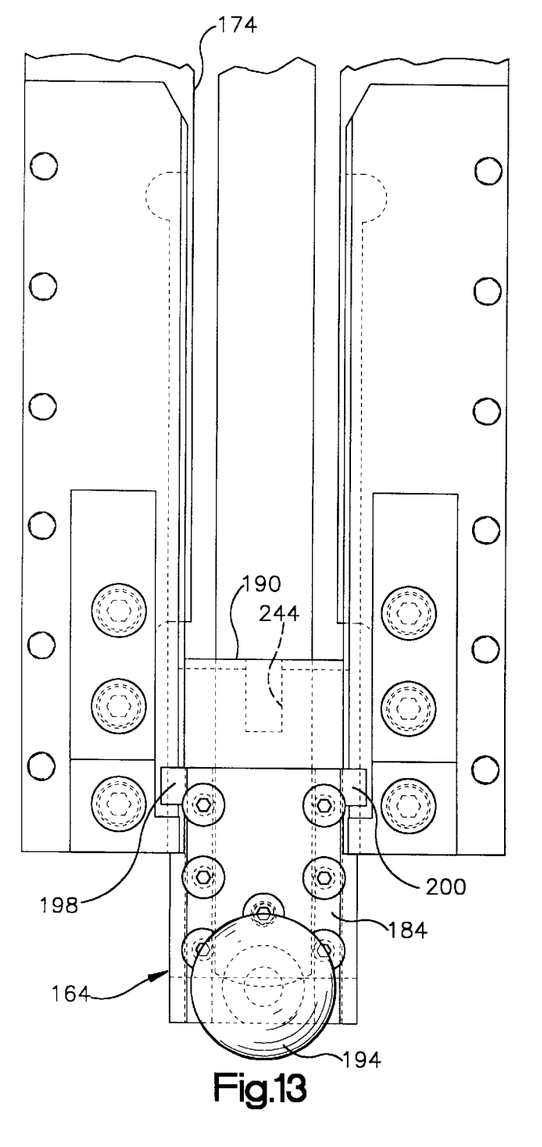
FIG. 13 is a plan view, taken generally along the line 13—13 of FIG. 10, further illustrating the relationship of the pusher member of FIG. 12 to the supply housing.

To move the pusher member 164 to the holding position, the operator manually grasps a handle 194 (FIG. 12) connected with the pusher member 164 and pulls the pusher member toward the left (as viewed in FIGS. 10 and 12). As this occurs, retaining flanges 198 and 200 (FIG. 13) on the pusher member 164 move into a slot which is offset to the left (as viewed in FIG. 10) of the side walls 178 and 180 (FIG. 11) of the housing 64. At this time, the pusher member is held in a position offset to one side, that is toward the left of the opening or slot 88 (FIG. 11) in which the stud retainer 70 is received. This enables the empty stud retainer 70 to be removed from the housing 64 and a next succeeding stud retainer, containing an array 72 of studs, loaded into the housing. By providing a holding or parking location for the pusher member 164 offset to one side of the opening or slot 88, the pusher member 164 remains connected with the housing during the unloading of an empty stud retainer 70 from the housing and the subsequent loading of a full stud retainer into the housing.

Stud Retainer

The stud retainer 70 (FIG. 3) holds a linear array 72 of studs 22. Stud retainer 70 is integrally formed from a single piece of polymeric material and includes a flat rectangular base wall 210 (FIGS. 3 and 4). A pair of side walls 212 and 214 extend parallel to the base wall 210. The side walls 212 and 214 are spaced apart from the base wall 210 by a distance which is equal to the diameter of a stud 22 to be held in the stud retainer 70 (FIG. 4) along with a small amount of clearance. A pair of parallel connector walls 216 and 218 extend between the side walls 212 and 214 and the base wall 210. The side walls 212 and 214 have parallel edges which define the slot 188 in the stud retainer 70.

The linear array 72 (FIG. 3) of studs 22 is held in the stud retainer 70 by a pair of detents 222 and 224. The studs 22 in the linear array 72 are disposed in a side-by-side relationship and have central axes which extend perpendicular to a central axis of the stud retainer 70. The linear array 72 has a central axis which is coincident with the central axis of the stud retainer 70.

The detents 222 and 224 extend through circular openings in the base wall 210. The detent 222 engages the uppermost (as viewed in FIG. 3) stud in the stud retainer 70 while the detent 224 engages the lowermost (as viewed in FIG. 3) stud 22 in the stud retainer. The detents 222 and 224 have the same construction and include circular head end portions 226 (FIG. 4) which engage an outer side surface of the flat base wall 210. The detents 222 and 224 have shank portions 228 which extend through circular openings in the base wall 210.

Immediately prior to insertion of the stud retainer 70 into the housing 64 of the stud supply 60 (FIG. 10), the upper detent 222 is manually pushed out of the opening in the base wall 210 of the stud retainer 70. This releases the array 72 of studs for movement through the upper end portion of the stud retainer 70. The lower detent 224 remains in place to prevent the linear array 72 of studs from moving out of the stud retainer 70 under the influence of gravity.

The stud retainer 70 is then inserted into the lower end of the housing 64 while the pusher member 164 is offset toward the left (as viewed in FIG. 10) of the opening or slot 88 in the housing 64. As the stud retainer 70 is moved into the housing 64, the leading end portion 190 of the stud retainer engages a cam surface 230 on a latch member 232. Engagement of the leading end portion of the stud retainer 70 with the cam surface 230 and latch member 232 pivots the latch member in a counterclockwise direction (as viewed in FIG. 10) against the influence of a biasing spring 234. The pivotal movement of the latch member 232 moves a nose or latching end portion 240 of the latch member to a disengaged position offset to the right (as viewed in FIG. 10) of the path of movement of the stud retainer 70 into the housing 64.

The stud retainer 70 with the linear array 72 of studs therein is then moved further into the opening or slot 88. When the lower end portion of the stud retainer 70 moves past the nose or latching end portion 240 on the latch member 232, the spring 234 is effective to move the latch member 232 back to the engaged position shown in FIG. 10. The pusher member 164 is then moved back into the slot or opening 188. The spring 168 (FIG. 9) pulls the pusher member 168 upward into the lower end portion of the slot 188 (FIG. 3) in the stud retainer 70.

A cam surface 244 (FIGS. 10 and 12) on the pusher member 164 engages the detent 224 (FIG. 3) at the lower end of the linear array 72 of studs 22. The force applied by the cam surface 244 against the detent 224 is effective to force the detent out of its opening in the base wall 210 of the stud retainer 70. The leading end portion 190 of the pusher member 164 then moves into engagement with the lowermost (as viewed in FIG. 10) stud 22 in the linear array 72 of studs.

The force transmitted from the spring 168 (FIG. 9) through the pusher member 164 (FIG. 10) to the linear array 72 of studs 22 moves the linear array of studs upward along the opening 88 in the housing 64. This moves the uppermost stud 22 in the stud retainer 70 into the opening in the feed plate 138. When the actuator member 80 is again manually pulled by the operator of the stud welding gun 20, the stud feed member 76 is pulled toward the right (as viewed in FIGS. 1 and 7) to enable the pusher member 164 (FIGS. 2 and 10) to move the uppermost stud 22 in the linear array 72 of studs upward from the feed plate 138 into the receiving location 62.

When the actuator member 80 is pushed forward, that is toward the left as viewed in FIG. 1, the stud feed member 76 (FIGS. 1 and 7) is effective to push the stud from the receiving location 62 toward the chuck 46. The next stud 22 to be welded is moved into the chuck 46, to the position illustrated in FIG. 7, as the stud feed member 76 is moved back to the extended position.

When all of the studs 22 have been removed from the stud retainer 70, the empty stud retainer is removed from the stud welding gun 20. To remove an empty stud retainer from the stud welding gun, the pusher member 164 is pulled downward (as viewed in FIG. 10) and moved to the holding position offset to one side of the opening 88. The latch member 232 is then manually depressed against the influence of the spring 234. The resulting counterclockwise rotation of the latch member 232 moves the latching end portion 240 of the latch member out of engagement with the lower end of the empty stud retainer 70. The empty stud retainer 70 then moves out of the opening or slot 88 under the influence of gravity.

Conclusion

An improved stud welding gun 20 is used to weld studs 22 to a base member. The stud welding gun 20 includes a frame 36 which extends outward from the handle assembly 24. A chuck 46 is disposed at an outer end portion of the frame 36 and holds a stud 22 during welding of the stud to the base member.

A stud supply 60 is connected with the frame. The stud supply 60 is operable to sequentially feed studs along a linear supply path to a receiving location 62 disposed between the handle assembly 24 and the chuck 46. A stud feed member 76 is connected with the frame 36 and is movable from a retracted position to an extended position to move a stud from the receiving location 62 toward the chuck 46. A manually engageable actuator member 80 is connected with the stud feed member 76 to move the stud feed member between the extended and retracted positions under the influence of force manually applied to the actuator member.

A latch 84 retains the stud feed member 76 in the extended position during welding of a stud 22 to a base member. The latch 84 is movable relative to the stud feed member 76 between an engaged condition and a disengaged condition.

The stud supply 60 includes a housing 64 which is connected with the frame 36. A stud retainer 70 holds a plurality of studs 22. The stud retainer 70 is disposed in an opening 88 in the housing 64 with a longitudinal central axis of each of the studs 22 extending along the path of movement of the stud feed member 76 between the extended and retracted positions. A stud mover or pusher member 164 sequentially moves studs 22 into the path of movement of the stud feed member 76.

Retainer members 70 of different sizes (FIGS. 3 and 5) are provided to hold studs 22 of different lengths. An opening 88 in which the retainer members 70 are inserted into the stud welding gun 20 can be changed in size to accommodate the different sizes of retainer members which hold the studs of different lengths.

From the above description of the invention, those skilled in the art will perceive improvements, changes and modifications. Such improvements, changes and modifications within the skill of the art are intended to be covered by the appended claims.

Having described the invention, the following is claimed:

1. A stud welding gun for use in welding studs to a base member, said stud welding gun comprising:

a handle assembly;

a frame which is connected with and extends outward from said handle assembly;

a stud holder disposed at an outer end portion of said frame, said stud holder being effective to hold a stud while an electrical current flows between the stud held by said stud holder and the base member during welding of the stud held by said stud holder to the base member;

a stud feed member which is connected with said frame and is movable from a retracted position to an extended position to move a stud toward said stud holder;

a housing which is connected with said frame;

at least two stud retainers having a plurality of studs each having opposed side walls spaced sufficiently to receive a plurality of studs in side by side array and opposed end walls, including a first retainer having end walls spaced to receive studs having a first length and a second retainer having end walls spaced to receive studs having a second length, and said housing adapted to receive either of said first and second retainers with a longitudinal central axis of each stud of the plurality of studs extending along the path of movement of said stud feed member between the extended and retracted positions; and a stud mover which sequentially moves studs in the plurality of studs into the path of movement of said stud feed member between the extended and retracted positions.

2. The stud welding gun described in claim 1, wherein said stud welding gun includes a first passage generally coaxially aligned with said stud holder, and a second passage spaced from said stud holder extending generally transverse to said first passage and communicating with said first passage for transmitting studs from said retainer to said stud holder.

3. The stud welding gun as described in claim 2, wherein one of said side walls of each of said retainers includes an opening extending generally perpendicular to the longitudinal axis of said plurality of studs for allowing said plurality of studs to be urged toward said second passage of said stud welding gun.

4. The stud welding gun as described in claim 3, wherein said stud welding gun includes a spring biasing element inserted through said opening in said retainer side wall for continuously urging said plurality of studs towards said second passage of said stud welding gun.

5. A method of operating a stud welding gun to weld studs of different lengths; said method comprising the steps of:

positioning a first retainer member holding a plurality of studs of a first length in an opening of a first size in the stud welding gun;

operating the stud welding gun to weld studs of the first length to a base member;

removing the first retainer member from the opening in the stud welding gun;

changing the opening in the stud welding gun from the first size to a second size which is different than the first size;

positioning a second retainer member holding a plurality of studs of a second length in the opening of a second size in the stud welding gun, said plurality of studs of a second length having a length which is different than a length of said plurality of studs of a first length; and operating the stud welding gun to weld the studs of a second length to a base member.

6. A method as set forth in claim 5 wherein said step of positioning a first retainer member holding a plurality of studs of a first length in an opening in the stud welding gun includes a moving the first retainer member into an opening which is at least partially defined by surfaces on first and second spacer members, the surfaces on the first and second spacer members being separated by a first distance, said step of changing the opening in the stud welding gun from a first size to a second size includes removing the first and second spacer members from the stud welding gun and installing third and fourth spacer members in the stud welding gun to at least partially define the opening in the stud welding gun with surfaces on the third and fourth spacer members, the surfaces on the third and fourth spacer members being separated by a second distance which is different than said first distance, said step of positioning a second retainer member holding a plurality of studs of a second length in an opening in the stud welding gun includes moving the second retainer member into an opening which is at least partially defined by surfaces on said third and fourth spacer members.

7. A method as set forth in claim 5 wherein said step of positioning a first retainer member holding a plurality of studs of a first length in an opening of a first size in the stud welding gun includes moving the first retainer member between parallel surfaces which are spaced a first distance apart and at least partially define the opening in the stud welding gun, said step of positioning a second retainer member holding a plurality of studs of a second length in the opening of a second size in the stud welding gun includes moving the second retainer member between parallel surfaces which are spaced apart and at least partially define the opening in the stud welding gun.

8. A method of welding studs of different lengths to base members using a stud welding gun, said stud welding gun having a chuck, a first passage generally coaxially aligned with said chuck, and a second passage spaced from said chuck extending generally transverse to said first passage and communicating with said first passage, said method comprising the following steps:

positioning a first retainer holding a plurality of studs each having a first length arrayed in side to side relation opposite said second passage of said stud welding gun and delivering a stud of said first length to said first passage of said stud welding gun;

delivering a stud of said first length through said first passage of said stud welding gun to said chuck and welding said stud of said first length to a base member;

removing said first retainer from said stud welding gun and positioning a second retainer holding a plurality of studs each having a second length different than said studs of said first length arrayed in side to side relation opposite said second opening of said stud welding gun and delivering a stud of said second length to said first passage of said stud welding gun; and delivering a stud of said second length through said first passage of said stud welding gun to said chuck and welding said stud of said second length to a base member.

9. The method of welding studs of different lengths to base members as defined in claim 8, wherein said first and second retainers each include opposed spaced side walls and opposed spaced end walls, said method including loading said first and second retainers with a plurality of studs in side to side array, wherein the distance between said end walls of said first retainer is generally equal to said studs of said first length and the distance between said end walls of said second retainer is generally equal to said studs of said second length.

10. The method of welding studs of different lengths to base members as defined in claim 9, wherein one of said side walls of each of said retainers includes an opening extending generally perpendicular to the longitudinal axis of said plurality of studs, said method including continuously urging said plurality of studs in said retainer toward said second passage of said stud welding gun through said opening in said retainer side wall.

11. The method of welding studs of different lengths to base members as defined in claim 10, wherein said stud welding gun includes a spring biasing element, said method including inserting said spring biased element through said opening in said retainer side wall and said spring biasing element continuously urging said plurality of studs towards said second passage of said stud welding gun.

* * * * *